UNITED STATES PATENT OFFICE.

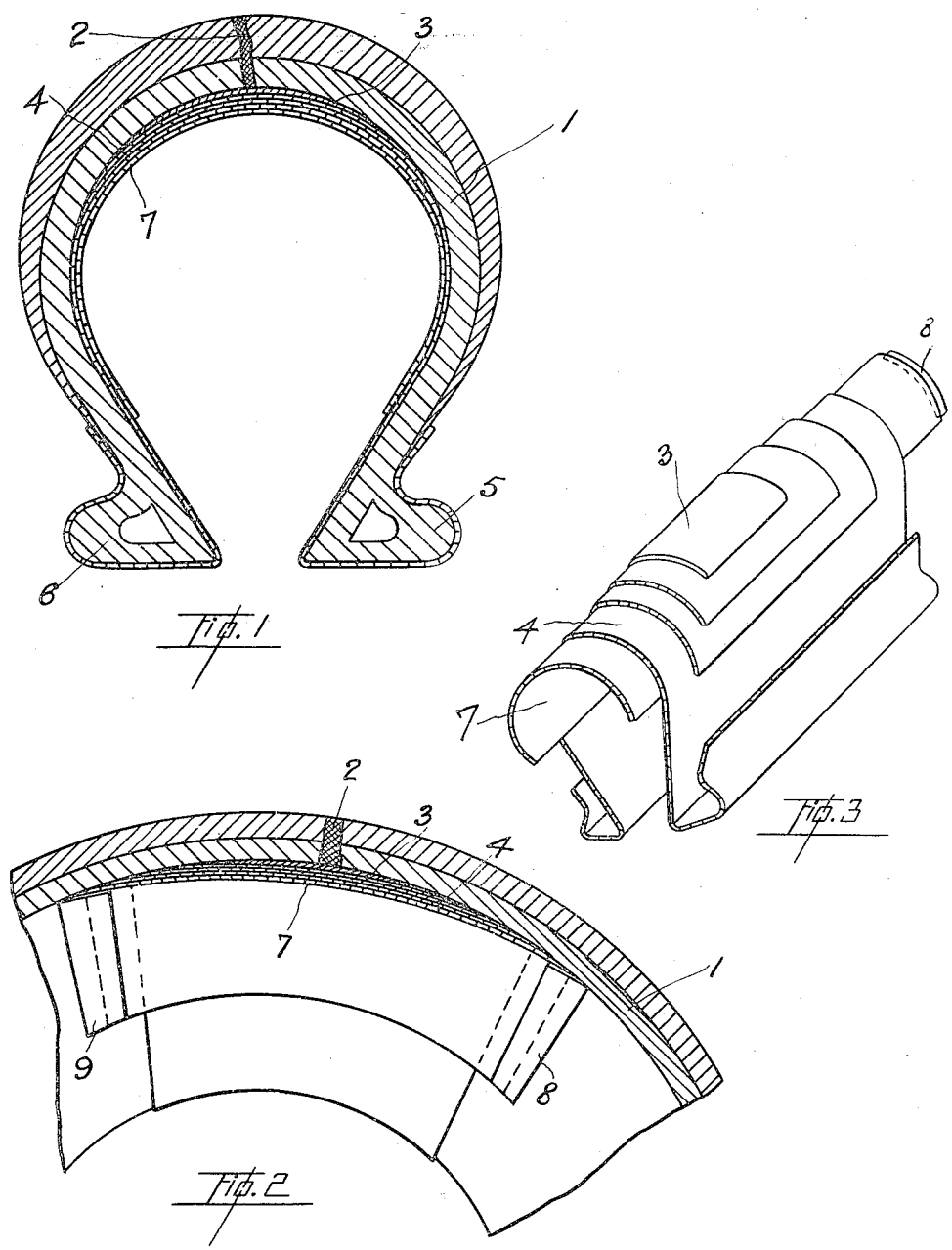

WILLIAM MARCHANT RAND, OF VANCOUVER, BRITISH COLUMBIA, CANADA.

TIRE-REPAIR METHOD.

1,241,553.   Specification of Letters Patent.   Patented Oct. 2, 1917.

Application filed April 21, 1917. Serial No. 163,668.

*To all whom it may concern:*

Be it known that I, WILLIAM MARCHANT RAND, a subject of the King of Great Britain, and a resident of the city of Vancouver, in the Province of British Columbia, Canada, have invented certain new and useful Improvements in Tire-Repair Methods, of which the following is a specification.

My invention relates to improvements in tire repair methods, and the object of my invention is to devise a method of repairing punctured pneumatic tire casings by means of which punctured casings may be rendered again highly serviceable and efficient at a low cost and without the necessity of vulcanizing, as is the common practice at the present time, such repair being much more enduring than a repair effected by vulcanizing, thereby lengthening the life of the tire at a minimum of expense.

I attain this object by the means illustrated in the accompanying drawings in which—

Figure 1 is a cross sectional view of a punctured tire casing as repaired by my method.

Fig. 2 is a fragmentary sectional view taken on the longitudinal center line of the casing.

Fig. 3 is a perspective view showing the elements employed in my method and assembled as a shoe.

Similar figures of reference indicate similar parts through the several views.

1 indicates a tire casing, punctured as at 2 in Figs. 1 and 2. In repairing this puncture I take first of all a piece of sheet rubber, indicated by the numeral 3 and attach it by suitable cement to the inside of the casing and covering the puncture. I then take a shoe 4 formed of several layers of fabric and cement it to the inside of the casing and to the rubber patch 3, the patch 3, being then positioned about intermediate the length of the shoe. The edges of the shoe are carried around the beads 5 and 6 on each side of the casing and up the walls for a short distance, as shown in Fig. 1. When the shoe is in position a strip of fabric 7 is cemented longitudinally of the casing on the inside of the shoe covering substantially the semi-circular surface thereof, the ends of this strip being extended beyond the ends of the shoe and cemented to the casing and in order to prevent dirt and chalk from getting between the strip 7 and the casing and also to prevent the end edges of the strip from chafing and possibly puncturing the inner tube, strips, 8 and 9 of raw rubber are placed over the end edges of strip 7 and cemented thereto and to the casing, after which the casing is ready for service, the puncture, of course, having been filled with suitable cement in the usual manner.

Instead of taking each of the elements described and placing and cementing them separately in position an assembled shoe embodying all the elements may be formed, as shown in Fig. 3, in which case all that is necessary in repairing the casing is to place the shoe therein with the rubber patch 3 covering the puncture and cement the entire shoe in place, the end edges of the strip 7 being covered in the manner already described.

The method of repairing in general use at the present time consists in placing a fabric shoe on the inside of the casing over the puncture and in direct contact with the casing, filling the puncture with suitable material, and then vulcanizing.

It is found, however, that the friction between the shoe and the casing soon destroys the shoe fabric and also that water, reaching the shoe, rots it. Further, the heat of vulcanizing has a detrimental effect on the casing.

When the method described in the foregoing specification is employed and the rubber patch is inserted between the shoe and the casing, the friction therebetween is practically eliminated, the rubber patch acting as a cushion, as it were, so that the shoe fabric remains long in an efficient condition without cracking or wearing and further, it does not rot as adverse weather conditions cannot affect it, the rubber effectually preventing water from reaching the shoe fabric. The detrimental effect on the casing due to the heat of the vulcanizing process, hereinbefore mentioned is also entirely eliminated.

As no expensive apparatus is required by my method and as old tires can be cut up and used to furnish the materials necessary for making repairs, it will be seen that punctured casings can be rendered serviceable and highly efficient at a very low cost.

What I claim as my invention is:

1. The method of repairing punctured pneumatic tire casings which consists in first attaching a rubber cushion to the inner wall of the casing so as to cover the puncture, then attaching a fabric shoe to the rubber portion and to the casing, and then disposing and attaching a strip of fabric longitudinally of the casing on the inside of the shoe, said strip being of a width sufficient to cover substantially the semi-circular surface of the shoe and having its ends extending beyond the ends of the shoe and attached to the casing.

2. The method of repairing punctured pneumatic tire casings which consists in first attaching a rubber cushion to the inner wall of the casing so as to cover the puncture, then attaching a fabric shoe to the rubber portion and to the casing, then disposing and attaching a strip of fabric longitudinally of the casing on the inside of the shoe, said strip being of a width sufficient to cover substantially the semi-circular surface of the shoe and having its ends extending beyond the ends of the shoe and attached to the casing, and finally attaching strips of rubber to the ends of the fabric strip and to the casing so as to cover the end edges of the strip.

3. A shoe for punctured pneumatic tire casings formed of fabric, a sheet of rubber disposed on the fabric to cover the puncture in the casing when the shoe is placed therein to form a cushion between the shoe and the casing whereby friction therebetween is eliminated, a fabric strip extending longitudinally of the casing on the inside of the shoe of sufficient width to cover the semi-circular surface of the shoe and having its ends extending beyond the ends of the shoe, and strips of rubber covering the juncture of the fabric and the casing.

Dated at Vancouver, B. C., this 12th day of April, 1917.

WILLIAM MARCHANT RAND.